(12) United States Patent
Kosaka et al.

(10) Patent No.: US 8,045,239 B2
(45) Date of Patent: Oct. 25, 2011

(54) EXTERNAL DEVICE CONFIGURATION APPARATUS, EXTERNAL DEVICE CONFIGURATION METHOD AND EXTERNAL DEVICE

(75) Inventors: Kiyoto Kosaka, Ishikawa (JP); Naoyoshi Kiku, Ishikawa (JP)

(73) Assignee: PFU Limited, Ishikawa (JP)

( * ) Notice: Subject to any disclaimer, the term of this patent is extended or adjusted under 35 U.S.C. 154(b) by 960 days.

(21) Appl. No.: 11/763,905

(22) Filed: Jun. 15, 2007

(65) Prior Publication Data
US 2008/0117442 A1    May 22, 2008

(30) Foreign Application Priority Data

Nov. 20, 2006   (JP) ................................ 2006-313001

(51) Int. Cl.
*H04N 1/04* (2006.01)
(52) U.S. Cl. ......... 358/474; 358/486; 358/497; 358/444
(58) Field of Classification Search .................. 235/375, 235/382; 358/444, 1.16, 486, 474, 442, 448, 358/468, 505, 488, 473, 465, 401, 501, 497; 382/318, 319, 312, 313
See application file for complete search history.

(56) References Cited

U.S. PATENT DOCUMENTS

| | | | | |
|---|---|---|---|---|
| 6,480,304 | B1 * | 11/2002 | Os et al. ........................ | 358/474 |
| 7,688,480 | B2 * | 3/2010 | Kuo .............................. | 358/486 |
| 2005/0141043 | A1 * | 6/2005 | Nakazawa ..................... | 358/444 |
| 2005/0242168 | A1 * | 11/2005 | Tesavis et al. ................. | 235/375 |

FOREIGN PATENT DOCUMENTS

| | | |
|---|---|---|
| CN | 1797321 | 7/2006 |
| JP | 06312562 | 11/1994 |
| JP | 09204515 | 8/1997 |
| JP | 2000115445 | 4/2000 |
| JP | 2000115446 | 4/2000 |
| JP | 2002190889 | 7/2002 |
| JP | 2005-092745 A | 4/2005 |
| JP | 2006-262207 A | 9/2006 |
| JP | 2007189500 | 7/2007 |
| JP | 2008011354 | 1/2008 |
| WO | 2005112423 A1 | 11/2005 |

OTHER PUBLICATIONS

Office Action dated Oct. 16, 2009 with English Translation.
Japanese Office Action for JP Application No. 2006-313001 mailed Mar. 29, 2011.

* cited by examiner

*Primary Examiner* — Houshang Safaipour
(74) *Attorney, Agent, or Firm* — Lowe, Hauptman, Ham & Berner, LLP

(57) ABSTRACT

An external device configuration apparatus includes a scanner controlling unit that controls a scanner for scanning an image, an external device controlling unit that determines whether the external device is connected, and an integrated management unit that when it is determined that the external device is connected by the external device controlling unit, acquires setting information about the scanner memorized in the external device and configures the setting for scanning of the image by the scanner based on the acquired setting information.

8 Claims, 3 Drawing Sheets

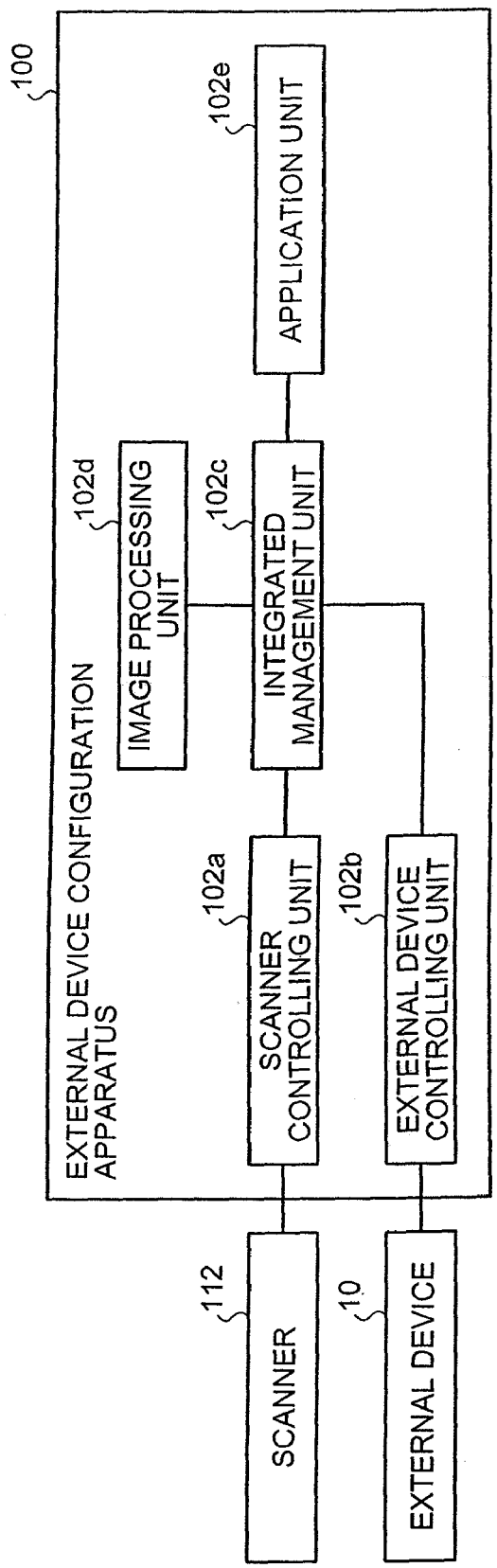

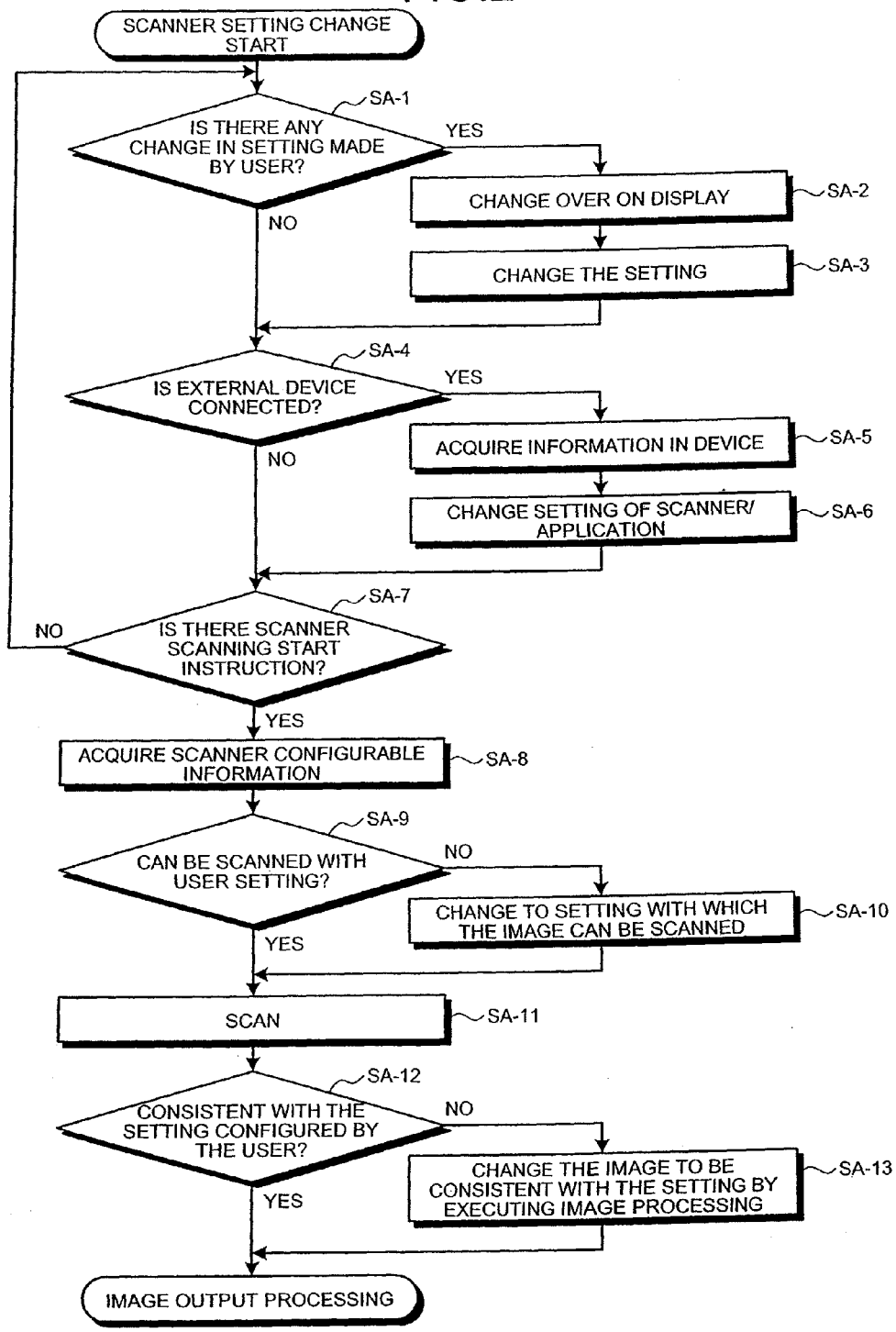

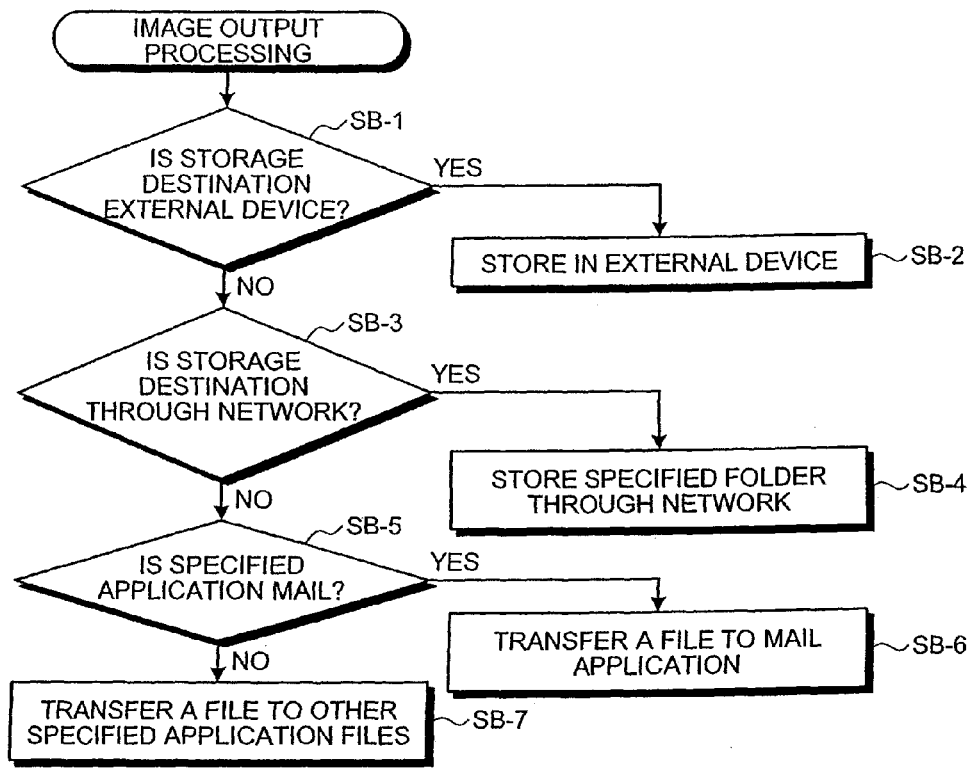

EXTERNAL DEVICE CONFIGURATION APPARATUS, EXTERNAL DEVICE CONFIGURATION METHOD AND EXTERNAL DEVICE

RELATED APPLICATIONS

The present application is based on, and claims priority from, Japan Application Number 2006-313001, filed Nov. 20, 2006, the disclosure of which is hereby incorporated by reference herein in its entirety.

BACKGROUND OF THE INVENTION

1. Field of the Invention

The present invention relates to an external device configuration apparatus, an external device configuration method and an external device and more particularly to an external device configuration apparatus, an external device configuration method and an external device for use in configuring the setting for a scanner.

2. Description of Related Art

Conventionally, when changing the setting for a scanner or an application, a user generally changes the setting by operating the computer or scanner.

Conventionally, it has been intended to simplify the configuration of the setting for scanner or application by memorizing the setting information of the scanner setting or the application setting used previously or a setting pattern having a plurality of setting items in the computer.

However, according to the conventional method, when a scanner is used by the users, each user needs to confirm whether a preferred setting is configured before scanning or if the setting that the user does not want is configured, the user needs to reconfigure the setting. Further, the conventional method has such a problem that if the scanner is shared by the users, sometimes the application that user wants to use does not exist in the computer to be used.

Particularly, the conventional method has a problem that even if the setting information used previously is memorized in the computer, the user needs to call the setting that the user used previously from memorized history by operating the computer.

When an equipment is shared by the users, a method of storing individual setting in the external memory apparatus can be considered. For example, JP-A-2006-262207 has disclosed a method of controlling image processing corresponding to individual setting in which when the user uses such an equipment by using a USB memory that memorizes the individual setting. Further, JP-A-2005-092745 has disclosed a method in which when the user uses the equipment by using a portable memory apparatus that memorizes an application or the like, a specific program is started up, user authorization is executed and data is stored in the portable memory apparatus when the program is ended.

However, the method described in JP-A-2006-262207 is a method of processing an image distributed from an apparatus having distribution function and the method described in JP-A-2005-092745 is a method of using an external memory apparatus instead of an internal memory apparatus in order to ensure the security and there is a problem that the both methods cannot be applied as a method for autoconfiguration of a connected scanner.

SUMMARY OF THE INVENTION

The present invention has been achieved in view of the above problem and an object of the invention is to provide an external device configuration apparatus, an external device configuration method and an external device capable of automatically configuring the setting corresponding to individual users without necessitating the users performing the complicated configuration operation, when using a scanner.

An external device configuration apparatus according to one aspect of the present invention includes a scanner controlling unit that controls a scanner for scanning an image, an external device controlling unit that determines whether the external device is connected, and an integrated management unit that, when it is determined that the external device is connected by the external device controlling unit, controls to acquire setting information about the scanner memorized in the external device and to configure the setting for scanning of the image by the scanner based on the acquired setting information.

An external device configuration method according to another aspect of the present invention is executed in the external device configuration apparatus for configuring the setting for the scanner for scanning an image, wherein the external device configuration method includes external device controlling step of determining whether the external device is connected, setting information acquiring step of acquiring setting information related to the scanner memorized in the external device when it is determined that the external device is connected in the external device controlling step, and scanner configuration step of configuring the setting for scanning of the image by the scanner based on the setting information acquired in the setting information acquiring step.

An external device according to still another aspect of the present invention is capable of being connected to the external device configuration apparatus for configuring the setting for the scanner for scanning an image, wherein the external device memorizes setting information that when connected to the external device configuration apparatus, is read by the external device configuration apparatus and used for configuring the setting for scanning the image by the scanner.

According to the present invention, individual users can automatically configure the setting for the scanner only by connecting a memory medium. Further, the present invention has such an effect that the scanner can be made to cooperate with an application easily.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram showing an example of logical framework of the present external device configuration apparatus to which the present invention is applied;

FIG. 2 is a flow chart showing an example of image scan setting processing of the external device configuration apparatus of the present embodiment; and FIG. 3 is a flow chart showing an example of output processing in the external device configuration apparatus of the present embodiment.

DETAILED DESCRIPTION OF THE PREFERRED EMBODIMENTS

Hereinafter, the embodiment of the external device configuration apparatus, the external device configuration method and the external device of the present invention will be described in detail. In the meantime, the present embodiment does not limit the present invention to any particular one.

[Outline of the Present Invention]

Hereinafter, the outline of the present invention will be described and after that, the framework, processing and the like of the present invention will be described in detail.

Schematically, the present invention has following basic features. That is, the present invention determines whether any external device is connected in an external device configuration apparatus that configures the setting for a scanner for scanning images.

The "external device" mentioned here refers to an external apparatus having a memory means constructed to be connectable. This external apparatus includes, for example, a flash memory such as a portable USB memory, flexible disk, CD (including CD-R, CD-ROM etc.), MD, DVD (DVD-R, DVD-ROM, DVD-RAM etc.) and the like.

Then, the present invention acquires setting information regarding the scanner memorized in the external device when it is determined that any external device is connected.

The "setting information" mentioned here refers to information concerning setting for image scan, for example, setting information inherent in the scanner, setting information in file format, setting information of output destination and storage destination of a file to be output from the scanner, setting information of compression rate, setting information of original document size, setting information for showing scan time, setting information of optical character scanning, application setting information and the like.

Further, the present invention configures the setting for image scan by the scanner based on the acquired setting information.

The present invention may determine whether configuration of the setting for the scanner based on acquired setting information is possible and control so as to configure the setting for the scanner about a setting determined to be capable of being configured among scanner settings based on the setting information.

Further, the present invention may be constructed to control an output unit or an input unit for the user to select changing of setting about the setting determined to be incapable of being configured among the scanner settings based on the acquired setting information.

Further, the present invention may control image information scanned by the scanner to be capable of being configured by image processing about the setting determined to be incapable of being configured among the scanner settings based on the setting information.

Further, the present invention may be constructed to store image information scanned by the scanner or image information of processed image in an output unit set as an output destination or storage destination based on the setting information.

According to the present invention, individual users can allow the setting for the scanner to be automatically configured only by connecting a memory medium and allow the scanner to cooperate with an application easily. Particularly, if the scanner is used by the users, the setting corresponding to individual users can be automatically configured without the users necessitating the complicated configuration operation.

[Framework of External Device Configuration Apparatus]

The framework of the external device configuration apparatus will be described with reference to FIG. 1. FIG. 1 is a block diagram showing an example of the logical framework of the external device configuration apparatus to which the present invention is applied and indicates only portions related to the present invention in the framework functionally and conceptually. As shown in FIG. 1, an external device configuration apparatus 100 is constructed to be capable of being connected to an external device 10 and a scanner 112 through a communication passage or the like schematically.

Here, the scanner 112 is an image scanning means constructed to be capable of being connected to the external device configuration apparatus 100 for scanning images.

The external device 10 is an external device that can be connected to the external device configuration apparatus 100 and when connected to the external device setting device 100, allows the external device configuration apparatus 100 to read and store setting information for configuring the setting for scanning an image. That is, the memory means of the external device 10 memorizes the setting information, for example, setting information inherent in the scanner, setting information in file format (for example, PDF format, JPEG format, TIFF format and the like), setting information of an output destination or a storage destination output from the scanner, setting information of compression rate, setting information of original document size, setting information for showing scan time (for example, setting for time stamp service), setting information of optical character scanning, setting information of application and the like.

The setting information of the scanner will be described in more detail. The scanner setting information includes various setting information such as original document size, compression rate, file format, color/monochrome/gray selection, brightness adjustment, color tone adjustment, resolution, single side/double side selection, image direction correction, image inclination correction, removal of blank paper and the like.

As shown in FIG. 1, as the logical framework of the inside of the external device configuration apparatus 100, the external device configuration apparatus 100 is constituted of a scanner controlling unit 102a, an external device controlling unit 102b, an integrated management unit 102c, an image processing unit 102d and an application unit 102e functionally and conceptually.

The scanner controlling unit 102a is a scanner control means that controls the scanner. That is, the scanner controlling unit 102a is a scanner control means that controls the scanner 112 using the CPU of the external device configuration apparatus 100, memory, interfaces such as USB port and the like, and carries out monitoring of connection of the scanner 112, monitoring of the button operation of the scanner 112, monitoring of scanning start instruction, control on writing an image scanned by the scanner 112 into memory apparatus (for example, memory, hard disk and the like) of the external device configuration apparatus 100, control on sending of scanned image to the integrated management unit 102c.

The external device controlling unit 102b is an external device control means that controls the external device 10. That is, the external device controlling unit 102b is an external device control means that controls the external device 10 using the CPU of the external device configuration apparatus 100, memory, interfaces such as USB port and the like and carries out monitoring of connection of the external device 10, acquisition of information (setting information inherent in the scanner and the like) stored in the memory means of the external device 10, control for notifying information acquired form the external device 10 to the integrated management unit 102c and the like.

The integrated management unit 102c is an integrated management means that manages integrally the scanner controlling unit 102a, the external device controlling unit 102b, the image processing unit 102d, and the application unit 102e. That is, the integrated management unit 102c functions as the integrated management unit 102c by executing processing in cooperation with the scanner controlling unit 102a, the external device controlling unit 102b, the image processing unit 102d, the application unit 102e using CPU and memory. For example, if it is determined that the external device 10 is connected by control of the external device controlling unit 102b, the integrated management unit 102c acquires the setting information memorized in the external device 10 through the external device controlling unit 102b and controls so as to configure the setting for scanning images based on the acquired setting information. The setting control for image scanned by the integrated management unit 102c includes making the control apparatus of the external device configuration apparatus 100 function as the application unit 102e by reading an application program when the application program is stored in the memory means of the external device as the setting information.

The integrated management unit 102c may determine whether the setting for the scanner 112 can be configured based on setting information by processing of the scanner controlling unit 102e and control the scanner controlling unit 102a so as to configure the setting for the scanner 112 about the setting determined to be capable of being configured among the scanner settings based on the setting information. Further, the integrated management unit 102c may control an output unit or an input unit for the user to select changing of a setting about the setting determined to be incapable of being configured among the settings of the scanner 112 based on the setting information by processing of the scanner controlling unit 102a. The integrated management unit 102c may execute the image processing about a setting determined to be incapable of being configured among the settings of the scanner based on the setting information by processing of the scanner controlling unit 102a for the image information scanned by the processing of the scanner 112 and control the image processing unit 102d so as to make the setting to be capable of being configured. Further, the integrated management unit 102c may control to store image information scanned by the scanner 112 by processing of the scanner controlling unit 102a or image information processed by the image processing unit 102d into an output unit (output apparatus) set as a storage destination based on the setting information by controlling the I/O interface or the like.

The image processing unit 102d is an image processing means that executes image processing. That is, the image processing unit 102d supplements the image processing that cannot be carried out by the scanner 112 by processing the image information scanned by the scanner 112 (stored in the memory apparatus) by processing of the scanner controlling unit 102a using a control apparatus such as CPU, and video chip and memory. The image processing unit 102d may execute image processing about a setting determined to be incapable of being configured among settings of the scanner 112 based on the setting information by the scanner controlling unit 102a to image information scanned by the scanner 112 by processing of the scanner controlling unit 102a so as to control to make the setting to be capable of being configured.

The application unit 102e is an application means that supplements the functions of OS and other applications. That is, the application unit 102e functions as an application means having a specific function by reading an application program memorized in the internal memory apparatus or the memory means of the external device 10 using CPU and memory.

The logical framework of the external device configuration apparatus 100 has been described briefly above. The external device configuration apparatus 100 may be connected to the network to be communicatable through a communication apparatus such as rooter and wired or wireless communication line such as leased line. At this time, the external device configuration apparatus 100 is constructed with a communication control interface to be connected to a communication apparatus such as the rooter connected to the communication line or the like. That is, the communication control interface has a function of controlling communication between the external device configuration apparatus 100 and the network (or communication apparatus such as the rooter) etc. and exchanging data with other terminal (including the scanner 112 and the external device 10) through the communication line.

[External Device Setting Processing]

Next, an example of the processing of the external device configuration apparatus of the present embodiment having the above-described structure will be described in detail with reference to FIGS. 1 to 3.

[Image Scan Setting Processing]

First, the detail of the image scan setting processing will be described with reference to FIG. 2. FIG. 2 is a flow chart showing an example of the image scan setting processing in the external device configuration apparatus of the present embodiment.

As shown in FIG. 2, the integrated management unit 102c determines whether the user has changed the setting (step SA-1). More specifically, if the user changes a setting other than settings based on the setting information memorized in the external device 10 himself, the integrated management unit 102c determines whether the user has changed the setting by operating the input apparatus, the external device configuration apparatus, or the like.

Then, when it is determined that the user is permitted to change the setting (Yes in step SA-1), the integrated management unit 102c indicates on a display screen (display screen) by controlling the display apparatus and controls to cause the user to input information about the setting change (step SA-2).

The integrated management unit 102c changes the setting based on the input setting change information and proceeds to step SA-4 (step SA-3).

If the integrated management unit 102c determines that the user has not changed the setting (No in step SA-1) or the above-described setting change (step SA-3) is ended, the external device controlling unit 102b determines whether the external device 10 is connected (step SA-4).

If it is determined that the external device 10 is connected as a result of the processing of the external device controlling unit 102b (Yes in step SA-4), the integrated management unit 102c acquires the setting information memorized in the memory means of the external device 10 by processing of the external device controlling unit 102b (step SA-5).

The integrated management unit 102c configures the setting for the scanner, application or the like for scanning images based on the acquired setting information (step SA-6).

Returning to description of step SA-4, if the integrated management unit 102c determines that the external device 10 is not connected as a result of processing of the external device controlling unit 102b (No in step SA-4), the integrated management unit 102c determines whether scanning start instruction of the scanner 112 such as operation of the input unit by user is present (step SA-7).

If the integrated management unit 102c determines that no scanning start instruction is present (No in step SA-7), the processing returns to step SA-1, and the processing of the step SA-1 to step SA-7 is repeated. On the other hand, if the integrated management unit 102c determines that the scanning start instruction by the scanner 112 is present (Yes in step SA-7), the integrated management unit 102c acquires the configurable setting information of the scanner 112 by controlling the scanner controlling unit 102a (step SA-8).

Then, the integrated management unit 102c determines whether the setting for the scanner 112 can be configured by the scanner controlling unit 102a by comparing the acquired configurable setting information, the setting change information inputted in step SA-2 or the setting information acquired in step SA-5 (step SA-9).

The integrated management unit 102c controls to cause the user to select changing of the setting by controlling the output unit or input unit about the setting determined to be incapable of being changed among the settings of the scanner 112 based on the setting information or setting change information and changes the setting by the scanner controlling unit 102a based on the selected change information (step SA-10).

On the other hand, the integrated management unit 102c controls to configure the setting by controlling the scanner controlling unit 102a about the setting determined to be capable of being changed among the settings of the scanner 112 based on the setting information or setting change information (Yes in step SA-9).

Then, the integrated management unit 102c executes scanning of images by control of the scanner 112 by processing of the scanner controlling unit 102a after various setting by the scanner controlling unit 102a is completed (step SA-11).

When scanning of an image is ended, the integrated management unit 102c determines whether the acquired image reflects the setting information or the setting change information (including the setting change information selected in step SA-10) (step SA-12). More specifically, as an example, the integrated management unit 102c achieves the determination by acquiring information about the setting that cannot be configured by user's selection in step SA-10 among the settings determined to be incapable of being configured in step SA-9.

Regarding the setting determined not to reflect the setting information or the setting change information by processing of the integrated management unit 102c (No in step SA-12), the integrated management unit 102c controls to execute image processing of the setting by processing of the image processing unit 102d to reflect the setting (step SA-13).

If the integrated management unit 102c determines that a scanned image reflects the setting information or the setting change information (Yes in step SA-12) or the image processing by processing of the image processing unit 102d is ended, it executes output processing of the image information. The detail of the output processing will be described later. An example of the setting processing for scanning an image has been described above.

[Output Processing]

Next, the detail of the output processing will be described with reference to FIG. 3. FIG. 3 is a flow chart showing an example of the output processing of the external device configuration apparatus of the present embodiment.

The outline of the output processing is as follows. The integrated management unit 102c stores information of an image scanned by the scanner or information of an image processed by the image processing unit 102d in an output unit set as a storage destination based on the setting information.

That is, as shown in FIG. 3, the integrated management unit 102c determines whether any external device is set as a storage destination (step SB-1).

If it is determined that the storage destination is an external device (Yes in step SB-1), the integrated management unit 102c controls to store image information in the external device 10 by controlling the external device controlling unit 102b (step SB-2).

On the other hand, if it is determined that the storage destination is not external device (No in step SB-1), the integrated management unit 102c determines whether the storage destination is a destination through network (step SB-3).

If it is determined that the storage destination is a destination through network (Yes in step SB-3), the integrated management unit 102c controls to store the image information in a specified folder in the external storage apparatus at the network destination through network by controlling communication control interface.

On the other hand, if it is determined that the storage destination is not a destination through the network (No in step SB-3), the integrated management unit 102c determines whether the transfer destination is a mail application (step SB-5).

If it is determined that the transfer destination is a mail application, the integrated management unit 102c controls to transfer image information file to the application unit 102e that functions by the mail application and to transfer image information file to a specified mail address (step SB-6).

On the other hand, if it is determined that the transfer destination is not a mail application (No in step SB-5), the integrated management unit 102c determines whether the transfer destination is other specified application and if it is determined that the transfer destination is a specified application, the integrated management unit 102c transfers an image file to the application unit 102e that functions by the specified application (step SB-7). Consequently, the output processing is ended.

Other Embodiments

Although the embodiments of the present invention have been described above, the present invention may be carried out in various different embodiments within a range of technical philosophy described in the claims as well as the above-described embodiments.

Particularly, although the present embodiment has been described for the case that the scanner 112 and the external device configuration apparatus 100 are constructed of different casings, the embodiment is not limited to this example, but the scanner and the external device configuration apparatus may be constructed of a single casing. That is, for example, the external device configuration apparatus achieved with a micro chip or the like may be built in the scanner casing.

Although in the present embodiment, an example in which the external device configuration apparatus 100 executes its processing in a stand-alone manner has been described, the external device configuration apparatus may be constructed to execute the processing corresponding to a request from a client terminal constructed of a different casing and return a processing result to the client terminal. That is, for example, although the present embodiment has been described for the case that the scanner controlling unit 102a and the external device controlling unit 102b are constructed within the same casing, the embodiment is not limited to this example but the external device controlling unit 102b may be provided within the client terminal and the client terminal may send setting information read from the external device 10 to a scanner side server apparatus so that the scanner side server apparatus controls to configure the setting for scanning an image based on the received setting information under a control by the integrated management unit 102c.

Of processing described in the embodiments, all or part of processing described such that it can be automatically carried out may be carried out manually or all or part of processing described such that it can be carried manually may be automatically carried out according to a known method. Additionally, the processing procedure, control procedure, specific names, information including setting data and setting parameter of each processing, database configuration of image information or the like, described in the above document and drawings may be modified arbitrarily except as otherwise noted.

Each component of the external device configuration apparatus 100 is shown schematically in terms of function and does not need to be constructed physically as illustrated in the figures.

All or any part of processing function provided on each apparatus of the external device configuration apparatus 100, particularly each processing function carried out in the scanner controlling unit 102a to the application unit 102e may be achieved by central processing unit (CPU) and a program interpreted and carried out by the CPU or may be achieved as hardware by wired logic. In the meantime, application program or the like is recorded in a recording medium described later and read mechanically by the external device configuration apparatus 100 as required. That is, a memory apparatus such as ROM, HD or a memory means of the external device 10 or the like stores a computer program that gives an instruction to the CPU as operating system (OS) in cooperation so as to carry out various processing. This computer program is executed when it is loaded on the RAM and constructs a control apparatus in cooperation with the CPU.

This computer program may be memorized in a program server connected to the external device configuration apparatus 100 through any network, and all or part thereof may be downloaded as required.

Programs such as application program of the present invention may be stored in a computer readable recording medium (including external device). The "recording medium" mentioned here includes any "portable physical medium" such as flexible disk, magneto optical disk, ROM, EPROM, EEPROM, CD-ROM, MO, and DVD and "communication medium" that holds a program in a short period such as communication line or carrier for transmitting a program through network represented by LAN, WAN or Internet.

The "program" refers to data processing method described in any language or descriptive method, and can be of any type such as source code, and binary code. In the meantime, the "program" is not always limited to a singularly constructed one but includes a program constructed in a distributed state as plural modules or libraries or a program that achieves its function in cooperation with another program represented by the operating system (OS). In the meantime, as for a specific structure for reading a recording medium in each apparatus indicated in the embodiment, reading procedure, install procedure after the reading and the like, a known structure and procedure may be used.

Various database stored in the memory apparatus stores various programs, tables, database, web page files and the like for use in various processing or for providing web sites, the memory apparatus such as RAM, ROM, and storage means such as fixed disk apparatus like hard disk, flexible disk and optical disk.

The external device configuration apparatus 100 may be realized by connecting an existing information processing unit such as personal computer, and work station and installing software (including program, data and the like) that achieves a method of the present invention on the information processing unit.

The specific configuration of distribution and integration of apparatus is not limited to the illustrated example, but all or part of the apparatus may be constructed by functional or physical distribution or integration in any unit corresponding to addition of each component.

As described above, the present invention can provide an external device configuration apparatus, an external device configuration method and an external device that enables the user to change a scanner setting only by connecting a memory medium (external device) so as to easily make the scanner cooperate with an application, because the invention determines whether any external device is connected and if it is determined that the external device is connected, and the invention acquires setting information memorized in the external device and configures the setting for the scanner based on the acquired setting information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An external device configuration apparatus comprising:
a scanner controlling unit configured to control a scanner for scanning an image;
an external device controlling unit configured to determine whether an external device is connected to the external device configuration apparatus;
an integrated management unit coupled to the scanner controlling unit and the external device controlling unit, the integrated management unit being configured to acquire setting information about the scanner memorized in the external device and to configure a setting for scanning of the image by the scanner based on the acquired setting information if it is determined that the external device is connected to the external device configuration apparatus; and
an image processing unit coupled to the integrated management unit and configured to execute image processing,
wherein the integrated management unit is configured to determine whether it is possible to configure the setting for the scanner based on the acquired setting information by the scanner controlling unit, and to control the image processing unit to execute the image processing on image information scanned by the scanner to adjust the image information to be consistent with the acquired setting information.

2. The external device configuration apparatus according to claim 1 wherein the setting information includes setting information inherent in the scanner, setting information in file format, setting information of an output destination or a storage destination of a file to be output from the scanner, setting information of compression rate, setting information of original document size, setting information for showing scan time, setting information for optical character scanning, or setting information of an application.

3. The external device configuration apparatus according to claim 2 wherein the integrated management unit is configured to control the scanner controlling unit to configure the setting for the scanner using the acquired setting information if it is determined that using the acquired setting information for the scanner for scanning the image is possible.

4. The external device configuration apparatus according to claim 3 wherein the integrated management unit is configured to control an output unit or an input unit for a user to adjust the setting for the scanner if it is determined that using the acquired setting information for the scanner for scanning the image is not possible.

5. The external device configuration apparatus according to claim 1 wherein the integrated management unit is configured to store the image information of the scanned image or the processed image information processed by the image processing unit in an output destination or a storage destination based on the acquired setting information.

6. An external device configuration method performed by an external device configuration apparatus for configuring a setting for a scanner for scanning an image, the method comprising:

determining whether an external device is connected to the external device configuration apparatus;

acquiring setting information related to the scanner memorized in the external device if it is determined that the external device is connected to the external device configuration apparatus;

configuring the setting for the scanner based on the acquired setting information; and executing image processing on image information scanned by the scanner to adjust the image information to be consistent with the acquired setting information if it is determined that the configuration of the setting using the acquired setting information is not possible.

7. An external device capable of being connected to an external device configuration apparatus for configuring a setting for a scanner for scanning an image, the external device comprising:

a connector configured to connect the external device to the external device configuration apparatus; and a memory configured to store setting information for configuring the setting for the scanner for scanning the image and to store an application program for processing image information of the scanned image if the external device is connected to the external device configuration apparatus and the configuration of the setting for the scanner for scanning the image using the setting information is not possible.

8. The method of claim 6, further comprising:

determining whether the configuration of the setting for the scanner using the acquired setting information is possible;

configuring the setting for the scanner using the acquired setting information if it is determined that the configuration of the setting using the acquired setting information is possible; and controlling an output unit or an input unit for a user to adjust the setting if it is determined that the configuration of the setting using the acquired setting information is not possible.

\* \* \* \* \*